United States Patent [19]

Asahara et al.

[11] Patent Number: 5,532,319
[45] Date of Patent: Jul. 2, 1996

[54] BLOCK COPOLYMER COMPOSITION AND PRESSURE SENSITIVE ADHESIVE COMPOSITION

[75] Inventors: Itsuo Asahara; Minoru Takematsu, both of Kanagawa-ken, Japan

[73] Assignee: Nippon Zeon Co., Ltd., Tokyo, Japan

[21] Appl. No.: 395,006

[22] Filed: Feb. 27, 1995

[30] Foreign Application Priority Data

Feb. 28, 1994 [JP] Japan .................................. 6-055310
Feb. 28, 1994 [JP] Japan .................................. 6-055312

[51] Int. Cl.$^6$ .................................................. C08F 297/04
[52] U.S. Cl. ................................ 525/89; 525/98; 525/99; 525/314
[58] Field of Search ..................... 525/89, 98, 99, 525/314

[56] References Cited

U.S. PATENT DOCUMENTS

| | | | |
|---|---|---|---|
| 3,753,936 | 8/1973 | Marrs | 428/521 |
| 5,075,377 | 12/1991 | Kawabuchi | 525/89 |
| 5,372,870 | 12/1994 | Diehl | 525/314 |
| 5,399,627 | 3/1995 | Diehl | 525/314 |

FOREIGN PATENT DOCUMENTS

| | | |
|---|---|---|
| 51-26938 | 3/1976 | Japan . |
| 53-42345 | 11/1978 | Japan . |
| 61-26647 | 2/1986 | Japan . |
| 6-107745 | 4/1994 | Japan . |
| 92/20725 | 11/1992 | WIPO . |

*Primary Examiner*—Irina Zemel
*Attorney, Agent, or Firm*—Lowe, Price, LeBlanc & Becker

[57] ABSTRACT

A block copolymer composition comprising 20–90 wt. % of at least one block copolymer selected from the group consisting of block copolymers represented by the general formula $(S-B-I)_n-X$ and block copolymers represented by the general formula $(S-I-B)_n-X$, and 80–10 wt. % of at least one block copolymer selected from the group consisting of block copolymers represented by the general formula $S-B-I$ and block copolymers represented by the general formula $S-I-B$, and a pressure sensitive adhesive composition comprising, as a base polymer, the block copolymer composition are provided.

10 Claims, No Drawings

BLOCK COPOLYMER COMPOSITION AND PRESSURE SENSITIVE ADHESIVE COMPOSITION

FIELD OF THE INVENTION

The present invention relates to a block copolymer composition and a pressure sensitive adhesive composition comprising, as a base polymer, this block copolymer composition. More particularly, the present invention relates to a block copolymer composition excellent in heat stability (melt stability) or heat resistance and a pressure sensitive adhesive composition excellent in operating ability upon coating, pressure-sensitive adhesion properties and the like, which comprises, as a base polymer, the block copolymer composition.

BACKGROUND OF THE INVENTION

Thermoplastic elastomers such as styrene-isoprene-styrene block copolymers (hereinafter abbreviated as SIS type block copolymers) and styrene-butadiene-styrene block copolymers (hereinafter abbreviated as SBS type block copolymers) have heretofore been used as base polymers for pressure sensitive adhesives and hot-melt type pressure sensitive adhesives. There has also been known a pressure sensitive adhesive composition making combined use of both SIS type block copolymer and SBS type block copolymer as a base polymer (Japanese Patent Publication No. 42345/1978).

However, both SIS type block copolymer and SBS type block copolymer involve a drawback that they are poor in heat stability (melt stability). The SIS type block copolymer undergoes heat deterioration upon its melt processing, and so its melt viscosity rapidly decreases. The SBS type block copolymer undergoes crosslinking upon its melt processing, and so its melt viscosity rapidly increases. With respect to blends of these block copolymers, the melt viscosity rapidly increases due to change with time upon its heating. Therefore, upon hot-melt processing, hot-melt type pressure sensitive adhesives separately comprising these block copolymers as base polymers are difficult to reliably keep stability to their quality upon coating operation and hot-melt processing. In order to stably keep performance characteristics such as pressure-sensitive adhesion properties, such hot-melt type pressure sensitive adhesives require to shorten the storage time of melts before coating and heating time upon processing as much as possible and to strictly control their melt processing temperature. Accordingly, these hot-melt type pressure sensitive adhesives are poor in operating ability upon coating.

On the other hand, in order to provide a pressure sensitive adhesive composition having high holding power, it has been proposed to use a branched block copolymer synthesized by using a trifunctional or still higher polyfunctional coupling agent, For example, International Publication No. 92/20725 discloses a process in which styrene is polymerized in the presence of an organic lithium initiator, isoprene is next added to polymerize it, a minor amount of butadiene is further added to form a short butadiene polymer block on a polymeric terminal of an isoprene polymer block, and these polymer blocks are then subjected to a coupling reaction with a polyfunctional coupling agent to produce a branched block copolymer. A pressure sensitive adhesive composition obtained by using, as a base polymer, a branched block copolymer synthesized by this process and having a high coupling rate exhibits relatively high holding power, but is low in initial adhesive strength and adhesive strength, and is hence not well balanced among pressure-sensitive adhesion properties.

The present inventors found that block copolymers of the SBIS type, $(S-B-I)_n-X$ type and $(S-I-B)_n-X$ type, which contain the copolymerizing components in specific proportions and have specific physical properties, have the characteristics as a thermoplastic elastomer and exhibit excellent heat stability (Japanese Patent Application Laid-Open No. 107745/1994). Here, n stands for an integer of 2–4, and X means a residue of a bi-, tri- or tetrafunctional coupling agent. A pressure sensitive adhesive making use of any one of these block copolymers as a base polymer scarcely undergoes a change of melt viscosity with time under high-temperature conditions and is well balanced among pressure-sensitive adhesion properties such as tackiness, adhesive strength and holding power. A pressure sensitive adhesive composition making use of the SBIS type block copolymer as a base polymer exhibits excellent heat stability when holding for about 15 minutes at 240° C. However, its melt viscosity is decreased to a significant extent when holding for a long period of time at a high temperature (for example, for 72 hours at 180° C.). A pressure sensitive adhesive composition making use of the $(S-B-I)_n-X$ type or $(S-I-B)_n-X$ type block copolymer involves a problem that its transparency may be impaired, or it may undergo discoloration when holding for a long period of time at a high temperature. In addition, it may be insufficient in heat resistance according to a heat resistance test (shear adhesive failure temperature test) in some cases. In particular, a pressure sensitive adhesive composition making use of the branched block copolymer, in which n is 3 or 4, as a base polymer is insufficient in tackiness and adhesive strength.

In order to improve the balance among the pressure-sensitive adhesion properties, it has heretofore been proposed to use, as a base polymer, a mixture of a branched block copolymer and a linear block copolymer (Japanese Patent Application Laid-Open No. 26938/1976), or to use a mixture of block copolymers, $(A-B)_m-Y$ type and $(A-B)_2-X$ type block copolymers, synthesized by using a trifunctional or still higher polyfunctional coupling agent and a bifunctional coupling agent in combination (Japanese Patent Application Laid-Open No. 26647/1986). However, the pressure sensitive adhesive compositions making use of the conventionally-known mixtures of the block copolymers are not well balanced among pressure-sensitive adhesion properties such as tackiness, adhesive strength and holding power and are poor in heat stability or heat resistance. There is hence a demand for a further improvement.

OBJECTS AND SUMMARY OF THE INVENTION

It is an object of the present invention to provide a block copolymer composition which has the characteristics as a thermoplastic elastomer and is excellent in heat stability.

It is another object of the present invention to provide a pressure sensitive adhesive composition excellent in heat stability, which undergoes no discoloration, maintains good transparency and undergoes neither skinning nor gelation upon heating at a high temperature.

It is a further object of the present invention to provide a block copolymer composition which has the characteristics as a thermoplastic elastomer, exhibits a relatively low viscosity upon its melt processing and is excellent in heat resistance.

It is a still further object of the present invention to provide a pressure sensitive adhesive composition good in processability, high in holding power and excellent in heat resistance.

The present inventors have carried out an extensive investigation with a view toward overcoming the above-described problems involved in the prior art. As a result, it has been found that the above objects can be achieved by providing a resin composition comprising a block copolymer synthesized by a coupling reaction of the (S—B—I)$_n$—X type or (S—I—B)$_n$—X type, and an S—B—I type or S—I—B type block copolymer, and a pressure sensitive adhesive composition making use of this resin composition as a base polymer.

When the (S—B—I)$_2$—X type or (S—I—B)$_2$—X type block copolymer in which n is 2, among these block copolymers, is used as the block copolymer synthesized by the coupling reaction in combination with their corresponding S—B—I type or S—I—B type block copolymer, a resin composition excellent in, particularly, heat stability (melt stability, color tone and transparency), and a pressure sensitive adhesive composition well balanced among pressure-sensitive adhesion properties can be obtained. Besides, when the (S—B—I)$_3$—X type block copolymer in which n is 3 is used as the block copolymer synthesized by the coupling reaction in combination with the S—B—I type block copolymer, a resin composition which exhibits a low viscosity upon its melt processing and is excellent in heat resistance, and a pressure sensitive adhesive composition having high holding power and excellent heat resistance can be obtained.

The present invention has been led to completion on the basis of these findings.

According to the present invention, there is thus provided a block copolymer composition comprising (1) 20–90 wt. % of at least one block copolymer selected from the group consisting of block copolymers represented by the general formula (a):

(S—B—I)$_n$—X   (a)

and block copolymers represented by the general formula (b):

(S—I—B)$_n$—X   (b)

and (2) 80–10 wt. % of at least one block copolymer selected from the group consisting of block copolymers represented by the general formula (c):

S—B—I   (c)

and block copolymers represented by the general formula (d):

S—I—B   (d)

wherein in all the above formulae, S is a polymer block of an aromatic vinyl compound, B is a polymer block of butadiene, I is a polymer block of isoprene, X is a residue of a bi-, tri- or tetrafunctional coupling agent, and n is an integer of 2–4.

According to the present invention, there is also provided a pressure sensitive adhesive composition comprising 100 parts by weight of the block copolymer composition and 50–300 parts by weight of a tackifier.

DETAILED DESCRIPTION OF THE INVENTION

The block copolymer component (1) useful in the practice of the present invention is the block copolymer (a) and/or the block copolymer (b) obtained by subjecting active terminals of polymers to a coupling reaction with a bi-, tri- or tetrafunctional coupling agent upon the preparation of a block copolymer by solution polymerization.

The block copolymer (a) represented by the general formula (S—B—I)$_n$—X includes three kinds of block copolymers represented by the following general formulae:

(S—B—I)$_2$—X   (a-1)

(S—B—I)$_3$—X   (a-2)

(S—B—I)$_4$—X   (a-3)

The block copolymer (b) represented by the general formula (S—I—B)$_n$—X includes three kinds of block copolymers represented by the following general formulae:

(S—I—B)$_2$—X   (b-1)

(S—I—B)$_3$—X   (b-2)

(S—I—B)$_4$—X   (b-3)

The block copolymer (a-1) represented by the general formula (S—B—I)$_2$—X is a linear block copolymer having a structure obtained by subjecting active terminals of S—B—I block copolymers to a coupling reaction with a bifunctional coupling agent. The block copolymer (b-1) represented by the general formula (S—I—B)$_2$—X is a linear block copolymer having a structure obtained by subjecting active terminals of S—I—B block copolymers to a coupling reaction with a bifunctional coupling agent.

The block copolymers (S—B—I)$_3$—X (a-2) and (S—B—I)$_4$—X (a-3) are branched block copolymers having structures obtained by subjecting active terminals of S—B—I block copolymers to a coupling reaction with tri- and tetrafunctional coupling agents, respectively. The block copolymers (S—I—B)$_3$—X (b-2) and (S—I—B)$_4$—X (b-3) are branched block copolymers having structures obtained by subjecting active terminals of S—I—B block copolymers to a coupling reaction with tri- and tetrafunctional coupling agents, respectively.

The weight average molecular weight (in terms of polystyrene) of the block copolymer component (1) is generally 50,000 to 500,000 (50×10$^3$ to 500×10$^3$), preferably 100,000 to 400,000 (100×10$^3$ to 400×10$^3$) as determined by gel permeation chromatography (GPC). If the weight average molecular weight of the block copolymer component (1) is too low, a pressure sensitive adhesive composition obtained by using, as a base polymer, the block copolymer composition containing such a block copolymer component (1) becomes insufficient in holding power. On the other hand, any weight average molecular weight too high results in a pressure sensitive adhesive composition unsatisfactory in processability.

The blocks of S, B and I in the general formulae (a) and (b) include a substantial polymer block of the aromatic vinyl compound, a substantial polymer block of butadiene and a substantial polymer block of isoprene, respectively. Here, the term "substantial" means the case where the individual blocks mutually contain a small amount of bound units derived from other copolymerizing components, the case where B or I is a tapered block polymer which contains a small amount of styrene units in a proportion gradually increasing from one end to the other end of its block, or the case where at least a part of B or I is modified by hydrogenation.

As examples of the aromatic vinyl compound used in the block copolymer component (1), may be mentioned styrene, α-methylstyrene, p-methylstyrene, m-methylstyrene, o-methylstyrene, p-tert-butylstyrene, dimethylstyrene and vinylnaphthalene. Of these, styrene is particularly preferred from the viewpoints of easy availability, reactivity, physical properties of the resulting block copolymer, and the like.

The block copolymer component (2) useful in the practice of the present invention is the S—B—I type block copolymer (c) and/or the S—I—B type block copolymer (d). These block copolymers are linear block copolymers obtained by subjecting an aromatic vinyl compound, butadiene and isoprene to block copolymerization.

As described above, the blocks of S, B and I in the general formulae (c) and (d) include a substantial polymer block of the aromatic vinyl compound, a substantial polymer block of butadiene and a substantial polymer block of isoprene, respectively. As the aromatic vinyl compound used in the block copolymer component (2), there may be used the compounds mentioned above.

The weight average molecular weight (in terms of polystyrene) of the block copolymer component (2) is generally 10,000 to 300,000 ($10 \times 10^3$ to $300 \times 10^3$), preferably 20,000 to 250,000 ($20 \times 10^3$ to $250 \times 10^3$) as determined by gel permeation chromatography (GPC). If the weight average molecular weight of the block copolymer component (2) is too low, a pressure sensitive adhesive composition obtained by using, as a base polymer, the block copolymer composition containing such a block copolymer component (2) becomes insufficient in holding power. On the other hand, any weight average molecular weight too high results in a pressure sensitive adhesive composition unsatisfactory in processability.

In the block copolymer components (1) and (2) used in the present invention, the proportion of a bound aromatic vinyl compound is 10–50 wt. %, preferably 15–45 wt. % in total, the proportion of bound butadiene is 10–60 wt. %, preferably 15–45 wt. % in total, and the proportion of bound isoprene is 10–60 wt. %, preferably 25–55 wt. % in total.

If the proportion of the bound aromatic vinyl compound is lower than 10 wt. %, holding power is lowered when the resulting block copolymer composition is used as a base polymer for a pressure sensitive adhesive. On the contrary, any proportion exceeding 50 wt. % results in a pressure sensitive adhesive lowered in tackiness. If the proportion of the bound butadiene is lower than 10 wt. %, the melt viscosity of the resulting block copolymer composition is decreased due to variation with time, and moreover the holding power is lowered. On the other hand, if the proportion exceeds 60 wt. %, the melt viscosity of the resulting block copolymer composition is increased due to variation with time. If the proportion of the bound isoprene is lower than 10 wt. %, the melt viscosity of the resulting block copolymer composition is increased due to variation with time. On the other hand, if the proportion exceeds 60 wt. %, the melt viscosity of the resulting block copolymer composition is decreased due to variation with time. If the proportions of the bound styrene, bound butadiene and bound isoprene fall within the above-described ranges, respectively, a pressure sensitive adhesive good in all of tack, adhesive strength and holding power, i.e., excellent in pressure-sensitive adhesion properties can be provided when the resulting block copolymer composition is used as a base polymer for the pressure sensitive adhesive. Besides, if the proportions of the bound butadiene and bound isoprene fall within the above-described ranges, respectively, a block copolymer composition which is excellent in heat stability or heat resistance and scarcely undergoes a change of melt viscosity upon melt processing or is excellent in heat resistance even when it is low in melt viscosity can be provided.

The block copolymers (a) to (d) used in the present invention and the block copolymer compositions containing these components have the following properties:

(1) the proportion of 1,2-vinyl bonds in the butadiene segment being at most 15 wt. %;

(2) the proportion of 3,4-vinyl bonds in the isoprene segment being at most 10 wt. %;

(3) the storage modulus (G') in a viscoelasticity measurement being at least $1 \times 10^5$ Pa, preferably $1 \times 10^6$ to $3 \times 10^8$ Pa in a temperature range of from 0° C. to 50° C.; and (4) only one peak existing on loss tangent (tan δ) attributable to the butadiene polymer block and the isoprene polymer block in a temperature range of from −80° C. to −50° C.

When a resin composition obtained by using the block copolymer component (1) or component (2) having a storage modulus (G') lower than $1 \times 10^5$ Pa is used as a base polymer for a pressure sensitive adhesive, its holding power is lowered. On the contrary, any storage modulus exceeding $3 \times 10^8$ Pa results in a pressure sensitive adhesive lowered in tackiness. It is hence not preferable to use the block copolymer component (1) or (2) having a storage modulus (G') outside the above range.

For example, when an S—I—S type block copolymer and an S—B—S type block copolymer are blended, two peaks on loss tangent (tan δ) attributable to the butadiene polymer block and the isoprene polymer block, respectively, appear in a temperature range of from −80° C. to −50° C. A pressure sensitive adhesive composition making use of such a resin composition as a base polymer is small in tackiness and moreover may be lowered in holding power to a significant extent according to the compounding proportions of both copolymers.

The block copolymer compositions according to the present invention also preferably have the above-described properties (1) to (4). Therefore, preferable combinations of the block copolymer component (1) and the block copolymer component (2) are combinations of the same type of the block copolymers as described in the following (i) and (ii):

(i) (S—B—I)$_n$—X (a) S—B—I (c); and (ii) (S—I—B)$_n$—X (b) S—I—S (d).

More preferable combinations from the viewpoint of physical properties are as follows:

(iii) (S—B—I)$_2$—X (a-1) S—B—I (c);

(iv) (S—I—B)$_2$—X (b-1) S—I—B (d); and (v) (S—B—I)$_3$—X (a-2) S—B—I (c).

The block copolymer compositions obtained by the combinations of (iii) and (iv) are excellent in, particularly, heat stability. A pressure sensitive adhesive composition comprising, as a base polymer, one of these block copolymer compositions undergoes a scarce change of melt viscosity and a restrained change of color tone upon melt processing under high-temperature conditions and also maintains good transparency. The pressure sensitive adhesive composition is also excellent in flowability and undergoes neither skinning nor gelation.

The block copolymer composition obtained by the combination of (v) is excellent in, particularly, heat resistance. A pressure sensitive adhesive composition comprising, as a base polymer, this block copolymer composition is high in holding power and excellent in heat resistance. A pressure sensitive adhesive tape produced by using this pressure sensitive adhesive composition exhibits good tackiness even at a high temperature of about 70° C. in the shear adhesive failure temperature test. The pressure sensitive adhesive composition also exhibits a relatively low melt viscosity upon melt processing and hence is good in processability.

The compounding proportion of the block copolymer component (1) in the block copolymer composition is 20–90 wt. %, preferably 25–85 wt. %, more preferably 30–70 wt. %, while the compounding proportion of the block copolymer component (2) is 10–80 wt. %, preferably 15–75 wt. %, more preferably 30–70 wt. %. Any proportion of the block copolymer component (1) lower than 20 wt. % results in a pressure sensitive adhesive composition lowered in holding power, decreased in melt viscosity to a great extent upon heating at a high temperature and impaired in color tone, and hence is not preferred. Any proportion of the block copolymer component (1) exceeding 90 wt. % results in a pressure sensitive adhesive composition lowered in adhesive strength and moreover in transparency when heated to a high temperature, and hence is not preferred. In particular, in the case of the combination of (v), any proportion of the block copolymer component (1) exceeding 90 wt. % results in a pressure sensitive adhesive composition lowered in adhesive strength and moreover in both holding power and heat resistance, and hence is not preferred.

As examples of the bifunctional coupling agent used in synthesizing block copolymers in which n is 2 in the block copolymers (a) and (b), may be mentioned tin coupling agents such as tin dichloride, monomethyltin dichloride, dimethyltin dichloride, monoethyltin dichloride, diethyltin dichloride, monobutyltin dichloride, dibutyltin dibromide and monohexyltin dichloride; halogenated silicon coupling agents such as dichlorosilane, monomethyldichlorosilane, dimethyldichlorosilane, monoethyldichlorosilane, diethyldichlorosilane, monobutyldichlorosilane, dibutyldichlorosilane, monohexyldichlorosilane, dihexyldichlorosilane, dibromosilane, monomethyldibromosilane and dimethyldibromosilane; divinyl aromatic compounds such as divinylbenzene and divinylnaphthalene; halogenated alkanes such as dichloroethane, dibromoethane, dibromomethane, dichloropropane and dibromopropane; halogenated aromatic compounds such as dibromobenzene; and other coupling agents such as benzoic esters, CO, 2-chloropropene and 1-chloro-1,3-butadiene. Of these, dibromobenzene is preferred.

As examples of the polyfunctional coupling agent used in synthesizing block copolymers in which n is 3 or 4 in the block copolymers (a) and (b), may be mentioned tin coupling agents such as and methyltin trichloride and tin tetrachloride; halogenated silicon coupling agents such as silicon tetrachloride and silicon tetrabromide; alkoxysilanes such as tetramethoxysilane; and halogenated alkanes such as chloroform, trichloroethane, trichloropropane and tribromopropane. Of these, tetramethoxysilane is preferred.

The block copolymers (a) to (d) useful in the practice of the present invention can be prepared by successively polymerizing the respective monomer components in a hydrocarbon solvent using an organic lithium compound as a polymerization initiator in accordance with the conventionally-known method. The block copolymers (a) and (b) are obtained by preparing the respective polymer blocks of the S—B—I and S—I—B types having active terminals by successive polymerization and then conducting a coupling reaction with the coupling agent making good use of their active terminals.

Examples of the hydrocarbon solvent used in the preparation of the block copolymers include cyclopentane, cyclohexane, benzene, ethylbenzene, xylene and mixed solvents of at least one of these compounds with pentane, hexane, heptane, butane or the like.

Examples of the organic lithium compound used as the polymerization initiator include n-butyllithium, sec-butyllithium, tert-butyllithium, n-hexyllithium, iso-hexyllithium, phenyllithium and naphthyllithium. The polymerization initiator is generally used in a range of 0.01–1 part by weight per 100 parts by weight of the monomer component.

The block copolymer composition according to the present invention can be obtained by separately synthesizing the block copolymer component (1) and the block copolymer component (2) and then mixing these components by any known method. No particular limitation is imposed on the mixing method, and a method in which the components are heated and mixed in a Brabender, kneader or the like can be exemplified.

As another process for preparing the block copolymer composition according to the present invention, may be mentioned a process in which an S—B—I or S—I—B type block copolymer having active terminals is synthesized, and the resulting block copolymer is then partly coupled by selecting the kind of the coupling agent and controlling the amount of the coupling agent to be used upon conducting a coupling reaction. According to this process, the block copolymer compositions of the combinations (i) to (v) can be prepared at a stroke upon the coupling reaction.

Each of the block copolymer compositions according to the present invention can be used as a base polymer for pressure sensitive adhesives, and in particular, can be suitably used as a base polymer for hot-melt type pressure sensitive adhesive compositions making good use of its characteristics as a thermoplastic elastomer and good heat stability or heat resistance.

The pressure sensitive adhesive composition can be obtained by incorporating 50–300 parts by weight of a tackifier into 100 parts by weight of the block copolymer composition. As necessary, a softener may also be incorporated in a proportion of 0–100 parts by weight.

As the tackifier, there may be preferably used a low-molecular weight resin having a number average molecular weight of 300–3,000 and a softening point of 60°–130° C. as measured on the basis of the ring and ball method prescribed by JIS K-2207. Specific examples of the tackifier include rosin and rosin derivatives, polyterpene resins, aromatically modified terpene resins and hydrogenated products thereof, terpene phenol resins, cumarone.indene resins, aliphatic petroleum resins, aromatic petroleum resins and hydrogenated products thereof, aliphatic.aromatic copolymerization petroleum resins, dicyclopentadiene petroleum resins and hydrogenated products thereof, and low-molecular weight polymers of styrene or substituted styrene. Those compatible with the butadiene polymer block or isoprene polymer block of the individual block copolymers are preferred as the tackifier. Preferable examples thereof include the polyterpene resins, the aliphatic petroleum resins and the hydrogenated products of the aromatic petroleum resins. With a view toward improving the cohesion of the resulting pressure sensitive adhesive composition, the cumarone.indene resin or the low-molecular weight polymer of styrene or substituted styrene, which is compatible with the polymer block of the aromatic vinyl compound, may also be incorporated together with the tackifier compatible with the conjugated diene polymer blocks.

Examples of the softener include petroleum process oils such as paraffinic process oil, naphthenic process oil and aromatic process oil; natural oils such as castor oil and tall oil; dialkyl esters of dibasic acids, such as dibutyl phthalate, dioctyl phthalate and dibutyl adipate; and low-molecular weight liquid polymers such as liquid polybutene and liquid polyisoprene. The use of the paraffinic process oil or liquid polybutene of these softeners permits the provision of a pressure sensitive adhesive composition particularly stable to heat and ultraviolet rays and excellent in hue.

In the pressure sensitive adhesive composition, the tackifier is used in a proportion of 50–300 parts by weight, preferably 80–180 parts by weight per 100 parts by weight of the block copolymer composition. Any proportion lower than 50 parts by weight results in a pressure sensitive adhesive composition lowered in tackiness. On the contrary, any proportion exceeding 300 parts by weight results in a pressure sensitive adhesive composition lowered in holding power. The softener is used in a proportion of 0–200 parts by weight, preferably 5–150 parts by weight, more preferably 10–130 parts by weight per 100 parts by weight of the block copolymer composition. Any proportion departed from this range makes it difficult to provide a pressure sensitive adhesive composition well balanced among pressure-sensitive adhesion properties.

Other rubber components may be incorporated into the pressure sensitive adhesive composition within limits not impeding the objects of the present invention. Further, additives such as antioxidants, pigments and fillers may be suitably incorporated as desired.

No particular limitation is imposed on the preparation process of the pressure sensitive adhesive composition. Therefore, there may be used any process such as a mechanically mixing process making use of rolls, a Banbury mixer or a Dalton kneader, a hot-melt process in which heating and mixing are conducted by using a melting kettle equipped with a stirrer or a single- or twin-screw extruder, or a solvent process in which the compounding components are poured in a suitable solvent and stirred, thereby obtaining an intimate solution of the pressure sensitive adhesive composition.

The pressure sensitive adhesive composition may be evenly applied without using any solvent or in the form of its solution to a base material such as paper or a plastic film by means of a proper coater and dried as needed, thereby producing various kinds of pressure sensitive adhesive tapes or sheets. The block copolymer compositions according to the present invention are excellent in heat stability and hence scarcely undergo a change of melt viscosity with time upon heating and melting them. Therefore, they may be applied to base materials with good flowability by melting them without using any solvent. The block copolymer compositions may also be used as adhesives or sealants without applying to base materials, by fluidizing them by, for example, a method in which they are heated and melted, or they are dissolved in a suitable solvent.

The block copolymer compositions according to the present invention may be used, in addition to the application to the above-described pressure sensitive adhesive compositions, in applications making the best use of their characteristics, for example, as molded or formed articles such as sheets, films, injection-molded articles of various shapes and blow-molded articles, modifiers for various thermoplastic resins, materials for footwear, modifiers for asphalt, materials for electric cables, materials for vulcanized rubber, modifiers for vulcanized rubber, materials for appliances, automobile parts, industrial parts, utensils, toys and the like, etc.

ADVANTAGES OF THE INVENTION

According to the present invention, there are provided block copolymer compositions which have the characteristics as a thermoplastic elastomer, scarcely undergo a change of melt viscosity with time upon hot melt processing and are excellent in heat stability. Pressure sensitive adhesive compositions separately comprising, as base polymers, the block copolymer compositions according to the present invention having excellent heat stability are excellent in operating ability upon coating and flowability, and moreover undergo a scarce change of color tone, maintain excellent transparency and undergo neither skinning nor gelation upon heating at a high temperature, and hence are useful as hot-melt type pressure sensitive adhesive compositions.

According to the present invention, there are also provided block copolymer compositions which have the characteristics as a thermoplastic elastomer, and moreover are good in flowability and excellent in heat resistance. Pressure sensitive adhesive compositions separately comprising, as base polymers, the block copolymer compositions according to the present invention having excellent heat resistance are particularly high in holding power and excellent in heat resistance, and hence are useful as hot-melt type pressure sensitive adhesive compositions.

EMBODIMENTS OF THE INVENTION

The present invention will hereinafter be described more specifically by reference to the following examples and comparative examples. Incidentally, all designations of "part" or "parts" and "%" as will be used in the following examples mean part or parts by weight and wt. % unless expressly noted.

The measurements of physical properties were conducted in accordance with the following methods.

(1) Amounts of bound styrene, bound butadiene and bound isoprene:

Measured by the nuclear magnetic resonance method (NMR method) (unit: wt. %).

(2) Amount of vinyl bond:

The microstructures of a butadiene segment and an isoprene segment in each block copolymer were determined by the NMR method.

(3) Weight average molecular weight:

The weight average molecular weight of each block copolymer was determined from a molecular weight distribution curve obtained by means of a high-performance liquid chromatography (HCL-802A, manufactured by Tosoh Corp.) on the basis of a calibration curve obtained from the results of analysis of a standard polystyrene the molecular weight of which had been already known. In the determination, columns G-4000H and G-5000 in which polystyrene gel was packed were used in combination to conduct the determination under conditions of a column temperature of 40° C., a flow rate of a carrier (tetrahydrofuran) of 1.3 ml/min and a sample concentration of 0.6 g/l (unit: ×$10^3$). The proportion of the block copolymer component (1) to the block copolymer component (2) in each block copolymer composition was determined from peak areas of the respective block copolymers obtained by the high-performance liquid chromatography (unit: weight ratio)

(4) Measurement of viscoelasticity:

Measuring conditions of storage modulus (G') and loss tangent (tan δ) are as follows:

Apparatus: Rheometrics Dynamic Analyzer II (manufactured by Rheometrics Co.);
　　Testing method: torsion rectangular test;
　　Specimen: a strip specimen 42 mm long×12.5 mm wide×2 mm thick;

Frequency: 6.28 rad/sec;
Range of measuring temperature: −100° C. to 120° C.
(5) Pressure-sensitive adhesion properties:

Preparation of Pressure Sensitive Adhesive Composition

A pressure sensitive adhesive composition was prepared in accordance with the following formulation to determine its pressure-sensitive adhesion properties. More specifically, the respective components were kneaded in a Dalton kneader in accordance with the following formulation. The resulting composition was then dissolved in toluene (concentration of nonvolatile matter: 50%), and this solution was applied to a polyester film 25 μm thick to give a coat thickness of 25 μm, thereby producing a pressure sensitive adhesive tape.

Formulation of Pressure Sensitive Adhesive Composition

| Block copolymer composition | 100 parts |
| Tackifier (hydrogenation product of aromatic petroleum resin) | 170 parts |
| Softener (paraffinic process oil) | 65 parts |
| Antioxidant | 1 part |

1) Initial adhesive strength:

The initial adhesive strength was determined in the following manner in accordance with JIS Z-0237. A pressure sensitive adhesive tape 10 cm long was stuck at 23° C. on a slant face of a stainless steel plate placed at an inclination angle of 30 degrees with its adhesive face upside. Thirty steel balls of sizes from 3/32 inch up to 32/32 inch were separately rolled at an initial velocity of 0 along the slant face from the upper position 10 cm distant from the tape. The initial strength was expressed in terms of the size (the average value of the numbers of 5 balls) of the ball in the greatest diameter, which was stopped on the pressure sensitive adhesive tape at this time.

2) Adhesive strength:

The adhesive strength was determined in the following manner in accordance with JIS Z-0237. A pressure sensitive adhesive tape cut into 10 mm wide×100 mm long was stuck on a stainless steel plate polished with waterproof abrasive paper No. 280. The thus-stuck tape was then peeled off at 23° C. in a direction of 180 degrees at a rate of 200 mm/min to determine the adhesive strength (unit: g/cm).

3) Holding power:

The holding power was determined in the following manner in accordance with JIS Z-0237. A pressure sensitive adhesive tape was stuck on a stainless steel plate treated in the same manner as described above so as to come into contact at its area of 25 mm×10 mm. A load of 1 kg was then applied thereto at 23° C., thereby measuring the time required until the pressure sensitive adhesive tape was slid off from the stainless steel plate (unit: minute).

4) Heat stability test:

The melt viscosity of each pressure sensitive adhesive composition sample was measured by means of a flow tester at 180° C. under a load of 10 kg (unit: cps). This pressure sensitive adhesive composition sample was then heated at 180° C. for 72 hours, and its melt viscosity was measured again by the flow tester at 180° C. under a load of 10 kg (unit: cps), thereby determining a ratio of the melt viscosity after the heating to the melt viscosity before the heating (unit: %). This ratio indicates a retention of melt viscosity after the heat treatment. Heat stability is better as this value is greater.

The pressure sensitive adhesive composition sample after the heat treatment was observed visually to evaluate it in color tone and transparency.

5) Shear adhesive failure temperature test (S.A.F.T):

A shear adhesive failure temperature test (S.A.F.T) was conducted in accordance with the following measuring method. Namely, a pressure sensitive adhesive tape was stuck on a stainless steel plate so as to come into contact at its area of 25 mm×10 mm. After heating at 40° C. for 1 hour, a load of 1 kg was applied thereto, and the sample was heated at a rate of 0.5° C./min, thereby measuring the temperature at the time the pressure sensitive adhesive tape was slid off from the stainless steel plate (unit: °C.). Heat resistance is better as this value is greater.

EXAMPLES 1–4 AND COMPARATIVE EXAMPLES 1–2

Styrene, butadiene and isoprene were successively added into 1500 g of a cyclohexane solvent in a 3-liter autoclave in a dry nitrogen atmosphere to polymerize them by using 5.7 millimoles of n-butyllithium as a polymerization initiator. Thereafter, dibromobenzene was used as a coupling agent to conduct a coupling reaction, thereby preparing 6 kinds of block copolymer compositions (Examples 1–4 and Comparative Examples 1–2) containing an (S—B—I)$_2$—X type block copolymer and an S—B—I type block copolymer in varied proportions by weight as shown in Table 1. The proportions of the bound styrene, bound butadiene and bound isoprene in the respective block copolymers and block copolymer compositions were 30 wt. %, 21 wt. % and 49 wt. %, respectively. The weight average molecular weight of the (S—B—I)$_2$—X type block copolymer was 140×10$^3$, while the weight average molecular weight of the S—B—I type block copolymer was 70×10$^3$. The weight average molecular weights of the block copolymer compositions are as shown in Table 1.

Physical properties such as microstructure of the block copolymer compositions were as follows:

(1) Proportion of the 1,2-vinyl bond in the butadiene segment: 11.7%;

(2) Proportion of the 3,4-vinyl bond in the isoprene segment: 7.6%;

(3) Storage modulus (G'): 8.1×10$^6$ Pa (25° C.); and (4) Peak temperature on loss tangent (tan δ): −60° C. (one peak).

Separately using these six kinds of block copolymer compositions, pressure sensitive adhesive compositions were prepared to conduct tests on pressure-sensitive adhesion properties and heat stability. The results are shown in Table 1.

EXAMPLES 5–6

Styrene, isoprene and butadiene were successively added into 1500 g of a cyclohexane solvent in a 3-liter autoclave in a dry nitrogen atmosphere to polymerize them by using 5.7 millimoles of n-butyllithium as a polymerization initiator. Thereafter, dibromobenzene was used as a coupling agent to conduct a coupling reaction, thereby preparing 2 kinds of block copolymer compositions composed of an (S—I—B)$_2$—X type block copolymer and an S—I—B type block copolymer as shown in Table 1. The proportions of the bound styrene, bound isoprene and bound butadiene in the respective block copolymers and block copolymer compositions were 30 wt. %, 49 wt. % and 21 wt. %, respectively. The weight average molecular weight of the (S—I—B)$_2$—X type block copolymer was 140×10$^3$, while the weight average molecular weight of the S—I—B type block copolymer was 70×10$^3$. The weight average molecular weights of the block copolymer compositions are as shown in Table 1.

Physical properties such as microstructure of the block copolymer compositions were as follows:

(2) Proportion of the 3,4-vinyl bond in the isoprene segment: 7.8%;

(3) Storage modulus (G'): 5×10$^6$ Pa (25° C.); and (4) Peak temperature on loss tangent (tan δ): −61° C. (one peak).

Using this block copolymer, a pressure sensitive adhesive composition was prepared to conduct tests on pressure-sensitive adhesion properties and heat stability. The results are shown in Table 1.

TABLE 1

|  | Example | | | | | | Comparative Example | | |
| --- | --- | --- | --- | --- | --- | --- | --- | --- | --- |
|  | 1 | 2 | 3 | 4 | 5 | 6 | 1 | 2 | 3 |
| Block copolymer (1) | (S-B-I)$_2$-X | | | | (S-I-B)$_2$-X | | (S-B-I)$_2$-X | | — |
| Block copolymer (2) | S-B-I | | | | S-I-B | | S-B-I | | SBIS |
| Block copolymer S/B/I (weight ratio) | 30/21/49 | | | | 30/21/49 | | 30/21/49 | | |
| Composition (1)/(2) (weight ratio) | 30/70 | 50/50 | 70/30 | 90/10 | 50/50 | 70/30 | 95/5 | 15/85 | 0/100 |
| Weight average molecular weight × 10$^3$ | | | | | | | | | |
| Block copolymer (1) | 140 | 140 | 140 | 140 | 140 | 140 | 140 | 140 | — |
| Block copolymer (2) | 70 | 70 | 70 | 70 | 70 | 70 | 70 | 70 | 115 |
| Composition | 91 | 105 | 119 | 133 | 105 | 119 | 137 | 81 | — |
| Pressure-sensitive adhesion properties | | | | | | | | | |
| Initial adhesive strength 23° C. | 13.8 | 13.5 | 13.5 | 12.5 | 13.5 | 12.5 | 10.0 | 13.0 | 13.0 |
| Adhesive strength (g/cm) | 1350 | 1300 | 1100 | 1050 | 1100 | 1010 | 920 | 1100 | 920 |
| Holding power (min) | 150 | 150 | 300 | 1250 | 150 | 350 | 1000 | 75 | 168 |
| Heat stability test (180° C. × 72 hrs.) | | | | | | | | | |
| Retention of melt viscosity (%) | 70 | 75 | 75 | 80 | 75 | 78 | 70 | 50 | 22 |
| Color tone | Pale yellow | Pale yellow | Pale yellow | Pale yellow | Pale yellow | Pale yellow | Pale yellow | Pale brown | Pale brown |
| Transparency | Clear | Clear | Clear | Clear | Clear | Clear | Turbid | Turbid | Turbid |

(1) Proportion of the 1,2-vinyl bond in the butadiene segment: 11.4%;

(2) Proportion of the 3,4-vinyl bond in the isoprene segment: 7.7%;

(3) Storage modulus (G'): 8.0×10$^6$ Pa (25° C.); and (4) Peak temperature on loss tangent (tan δ): −61° C. (one peak).

Separately using these two kinds of block copolymer compositions, pressure sensitive adhesive compositions were prepared to conduct tests on pressure-sensitive adhesion properties and heat stability. The results are shown in Table 1.

COMPARATIVE EXAMPLE 3

Styrene, butadiene, isoprene and styrene were successively added into 1500 g of a cyclohexane solvent in a 3-liter autoclave in a dry nitrogen atmosphere to polymerize them by using 5.7 millimoles of n-butyllithium as a polymerization initiator, thereby producing an S—B—I—S type block copolymer. The proportions of the bound styrene, bound butadiene and bound isoprene in the resulting block copolymer were 30 wt. %, 21 wt. % and 49 wt. %, respectively, and its weight average molecular weight was 115×10$^3$.

Physical properties such as microstructure of the block copolymer were as follows:

(1) Proportion of the 1,2-vinyl bond in the butadiene segment: 12.1%;

As apparent from the results shown in Table 1, it is understood that the pressure sensitive adhesive compositions (Examples 1–6) obtained by respectively using the block copolymer compositions according to the present invention are high in initial adhesive strength, and moreover undergo neither extreme decrease of melt viscosity nor change of color tone, maintain excellent transparency and undergo neither skinning nor gelation even after heating at a high temperature of 180° C. for 72 hours.

On the contrary, in the cases where the proportions by weight of the block copolymer components are outside the ranges recited in the present invention (Comparative Examples 1–2), and where the S—B—I—S type block copolymer is used (Comparative Example 3), the resulting pressure sensitive adhesive compositions are badly balanced among the pressure-sensitive adhesion properties, and undergo a great change of melt viscosity with time (Comparative Examples 2–3) or deterioration of transparency (Comparative Examples 1–3), and hence are poor in heat stability.

EXAMPLES 7–9

Styrene, butadiene and isoprene were successively added into 1500 g of a cyclohexane solvent in a 3-liter autoclave in a dry nitrogen atmosphere to polymerize them by using 5.7 millimoles of n-butyllithium as a polymerization initiator. Thereafter, tetramethoxysilane was used as a coupling agent to conduct a coupling reaction, thereby preparing 3 kinds of block copolymer compositions (Examples 7–9) containing an (S—B—I)$_3$—X type block copolymer and an S—B—I type block copolymer in varied proportions by weight as shown in Table 2. The proportions of the bound styrene, bound butadiene and bound isoprene in the respective block copolymers and block copolymer compositions were 30 wt. %, 21 wt. % and 49 wt. %, respectively. The weight average molecular weight of the (S—B—I)$_3$—X type block copolymer was 210×10$^3$, while the weight average molecular weight of the S—B—I type block copolymer was 70×10$^3$. The weight average molecular weights of the block copolymer compositions are as shown in Table 2.

Physical properties such as microstructure of the block copolymer compositions were as follows:

(1) Proportion of the 1,2-vinyl bond in the butadiene segment: 11.8%;

(2) Proportion of the 3,4-vinyl bond in the isoprene segment: 7.5%;

(3) Storage modulus (G'): 3.0×10$^7$ Pa (25° C.); and (4) Peak temperature on loss tangent (tan δ): –60° C. (one peak).

Separately using these three kinds of block copolymer compositions, pressure sensitive adhesive compositions were prepared to conduct tests on pressure-sensitive adhesion properties and heat stability. The results are shown in Table 2.

EXAMPLES 10–12 AND COMPARATIVE EXAMPLES 4–5

Styrene, butadiene and isoprene were successively added into 1500 g of a cyclohexane solvent in a 3-liter autoclave in a dry nitrogen atmosphere to polymerize them by using 5.7 millimoles of n-butyllithium as a polymerization initiator. Thereafter, tetramethoxysilane was used as a coupling agent to conduct a coupling reaction, thereby preparing 5 kinds of block copolymer compositions (Examples 10–12 and Comparative Examples 4–5) containing an (S—B—I)$_3$—X type block copolymer and an S—B—I type block copolymer in varied proportions by weight as shown in Table 2. The proportions of the bound styrene, bound butadiene and bound isoprene in the respective block copolymers and block copolymer compositions were 30 wt. %, 49 wt. % and 21 wt. %, respectively. The weight average molecular weight of the (S—B—I)$_3$—X type block copolymer was 210×10$^3$, while the weight average molecular weight of the S—B—I type block copolymer was 70×10$^3$. The weight average molecular weights of the block copolymer compositions are as shown in Table 2.

Physical properties such as microstructure of the block copolymer compositions were as follows:

(1) Proportion of the 1,2-vinyl bond in the butadiene segment: 11.9%;

(2) Proportion of the 3,4-vinyl bond in the isoprene segment: 7.5%;

(3) Storage modulus (G'): 3.2×10$^7$ Pa (25° C.); and (4) Peak temperature on loss tangent (tan δ): –72° C. (one peak).

Separately using these five kinds of block copolymer compositions, pressure sensitive adhesive compositions were prepared to conduct tests on pressure-sensitive adhesion properties and heat stability. The results are shown in Table 2.

COMPARATIVE EXAMPLE 6

Styrene, butadiene, isoprene and styrene were successively added into 1500 g of a cyclohexane solvent in a 3-liter autoclave in a dry nitrogen atmosphere to polymerize them by using 5.7 millimoles of n-butyllithium as a polymerization initiator, thereby producing an S—B—I—S type block copolymer. The proportions of the bound styrene, bound butadiene and bound isoprene in the resulting block copolymer were 30 wt. %, 21 wt. % and 49 wt. %, respectively, and its weight average molecular weight was 152×10$^3$.

Physical properties such as microstructure of this block copolymer were as follows:

(1) Proportion of the 1,2-vinyl bond in the butadiene segment: 11.6%;

(2) Proportion of the 3,4-vinyl bond in the isoprene segment: 7.5%;

(3) Storage modulus (G'): 5.3×10$^6$ Pa (25° C.); and (4) Peak temperature on loss tangent (tan δ): –60° C. (one peak).

Using this block copolymer, a pressure sensitive adhesive composition was prepared to conduct tests on pressure-sensitive adhesion properties and heat stability. The results are shown in Table 2.

COMPARATIVE EXAMPLE 7

Styrene, butadiene and styrene were successively added into 1500 g of a cyclohexane solvent in a 3-liter autoclave in a dry nitrogen atmosphere to polymerize them by using 5.7 millimoles of n-butyllithium as a polymerization initiator, thereby producing an S—B—S type block copolymer. The proportions of the bound styrene and bound butadiene in the resulting block copolymer were 40 wt. % and 60 wt. %, respectively, and its weight average molecular weight was 148×10$^3$.

Similarly, styrene, isoprene and styrene were successively added to polymerize them, thereby producing an S—I—S type block copolymer. The proportions of the bound styrene and bound isoprene in the resulting block copolymer were 15 wt. % and 85 wt. %, respectively, and its weight average molecular weight was 150×10$^3$.

The S—B—S type block copolymer and S—I—S type block copolymer thus produced were blended in a proportion of 50:50 (by weight) to obtain a block copolymer composition.

Physical properties such as microstructure of this block copolymer composition were as follows:

(1) Proportion of the 1,2-vinyl bond in the butadiene segment: 11.7%;

(2) Proportion of the 3,4-vinyl bond in the isoprene segment: 7.7%;

(3) Storage modulus (G'): 4.5×10$^6$ Pa (25° C.); and (4) Peak temperature on loss tangent (tan δ): –77° C. and –52° C. (two peaks).

Using this block copolymer composition, a pressure sensitive adhesive composition was prepared to conduct tests on pressure-sensitive adhesion properties and heat stability. The results are shown in Table 2.

TABLE 2

| | Example | | | | | | Comparative Example | | | |
|---|---|---|---|---|---|---|---|---|---|---|
| | 7 | 8 | 9 | 10 | 11 | 12 | 4 | 5 | 6 | 7 |
| Block copolymer (1) | | (S-B-I)$_3$-X | | | (S-B-I)$_3$-X | | (S-B-I)$_3$-X | | — | SIS |
| Block copolymer (2) | | S-B-I | | | S-B-I | | S-B-I | | SBIS | SBS |
| Block copolymer S/B/I (weight ratio) | | 30/21/49 | | | 30/49/21 | | 30/49/21 | | 30/21/49 | 27.5/30/42.5 |
| Composition (1)/(2) (weight ratio) | 40/60 | 60/40 | 80/20 | 40/60 | 60/40 | 80/20 | 10/90 | 95/5 | 0/100 | 50/50 |
| Weight average molecular weight × 10$^3$ | | | | | | | | | | |
| Block copolymer (1) | 210 | 210 | 210 | 210 | 210 | 210 | 210 | 210 | — | 148 |
| Block copolymer (2) | 70 | 70 | 70 | 70 | 70 | 70 | 70 | 70 | 152 | 150 |
| Composition | 126 | 154 | 182 | 126 | 154 | 182 | 84 | 203 | — | 149 |
| Pressure-sensitive adhesion properties | | | | | | | | | | |
| Initial adhesive strength 23° C. | 12.0 | 11.9 | 11.7 | 12.8 | 12.5 | 12.0 | 13.0 | 12.0 | 13.3 | 12.6 |
| Adhesive strength (g/cm) | 1050 | 880 | 850 | 800 | 750 | 730 | 800 | 540 | 850 | 830 |
| Holding power (min) | 1000 | 1300 | >3000 | 550 | 600 | 700 | 30 | 200 | 160 | 30 |
| Heat resistance test (S.A.F.T) (°C.) | 70 | 72 | 75 | 70 | 70 | 72 | 50 | 65 | 55 | 55 |

As apparent from the results shown in Table 2, it is understood that the pressure sensitive adhesive compositions obtained by respectively using the block copolymer compositions according to the present invention are high in holding power and good in heat resistance. On the contrary, in the cases where the proportions by weight of the (S—B—I)$_3$—X type block copolymer to the S—B—I type block copolymer are outside the ranges recited in the present invention (Comparative Examples 4–5), the resulting pressure sensitive adhesive compositions are badly balanced among the pressure-sensitive adhesion properties, and also lowered in heat resistance. In the cases where the S—B—I—S type block copolymer is used (Comparative Example 6) and where the composition composed of the S—I—S type block copolymer and the S—B—S type block copolymer is used (Comparative Example 7), both resulting pressure sensitive adhesive compositions are poor in heat resistance, and also insufficient in balance among the pressure-sensitive adhesion properties.

We claim:

1. A block copolymer composition comprising (1) 20–90 wt. % of a block copolymer represented by the formula (a):

$$(S—B—I)_n—X \qquad (a)$$

and (2) 80–10 wt. % of a block copolymer represented by the formula (c):

$$S—B—I \qquad (c)$$

wherein in all the above formulae, S is a polymer block of an aromatic vinyl compound, B is a polymer block of butadiene, I is a polymer block of isoprene, X is a residue of a bi-, tri- or tetrafunctional coupling agent, and n is an integer of 2–4.

2. The block copolymer composition according to claim 1, wherein the block copolymer (a) is a block copolymer represented by the formula (a-1):

$$(S—B—I)_2—X \qquad (a-1).$$

3. The block copolymer composition according to claim 1, wherein the block copolymer (a) is a block copolymer represented by the formula (a-2):

$$(S—B—I)_3—X \qquad (a-2).$$

4. The block copolymer composition according to claim 1, wherein in both of the block copolymers represented by the formulae (a) and (c), the proportions of the bound aromatic vinyl compound, bound butadiene and bound isoprene are 10–50 wt. %, 10–60 wt. % and 10–60 wt. %, respectively.

5. The block copolymer composition according to claim 1, wherein the weight average molecular weight of the block copolymer represented by the formula (a) is 50×10$^3$ to 500×10$^3$, while the weight average molecular weight of the block copolymer represented by the formula (c) is 10×10$^3$ to 300×10$^3$.

6. The block copolymer composition according to claim 1, wherein the composition has the following properties:
  (1) the proportion of 1,2-vinyl bonds in the butadiene segment being at most 15 wt. %;
  (2) the proportion of 3,4-vinyl bonds in the isoprene segment being at most 10 wt. %;
  (3) the storage modulus (G') in a viscoelasticity measurement being at least 1×10$^5$ to 3×10$^8$ Pa in a temperature range of from 0° C. to 50° C.; and
  (4) only one peak existing on loss tangent (tan δ) attributable to the butadiene polymer block and the isoprene polymer block in a temperature range of from –80° C. to –50° C.

7. A pressure sensitive adhesive composition comprising 100 parts by weight of a block copolymer composition comprising (1) 20–90 wt. % of a block copolymer represented by the formula (a):

$$(S—B—I)_n—X \qquad (a)$$

and (2) 80–10 wt. % of a block copolymer represented by the formula (c):

$$S—B—I \qquad (c)$$

wherein in all the above formulae, S is a polymer block of an aromatic vinyl compound, B is a polymer block of butadiene, I is a polymer block of isoprene, X is a residue of a bi-, tri- or tetrafunctional coupling agent, and n is an integer of 2–4, and 50–300 parts by weight of a tackifier.

8. The pressure sensitive adhesive composition according to claim 7, which further comprises a softener in a proportion of 0–200 parts by weight per 100 parts by weight of the block copolymer composition.

9. The pressure sensitive adhesive composition according to claim 8, wherein the tackifier and the softener are incorporated in proportions of 80–180 parts by weight and 5–150 parts by weight, respectively, per 100 parts by weight of the block copolymer composition.

10. The pressure sensitive adhesive composition according to claim 7, which is a hot-melt type pressure sensitive adhesive composition.

* * * * *